United States Patent [19]
Yamada et al.

[11] Patent Number: 5,609,016
[45] Date of Patent: Mar. 11, 1997

[54] GAS TURBINE APPARATUS AND METHOD OF OPERATING SAME ON GASEOUS FUEL

[75] Inventors: Hiroshi Yamada; Tadanobu Negishi; Yoshitsugu Honda, all of Ibaraki-ken, Japan

[73] Assignee: Hitachi, Ltd., Tokyo, Japan

[21] Appl. No.: 361,503

[22] Filed: Dec. 22, 1994

[30] Foreign Application Priority Data

Dec. 28, 1993 [JP] Japan .................................. 5-334933

[51] Int. Cl.$^6$ .................................. F02C 3/22; F02C 9/26
[52] U.S. Cl. .................. 60/39.02; 60/39.281; 60/39.465
[58] Field of Search ........................... 60/39.02, 39.141, 60/39.281, 39.465

[56] References Cited

FOREIGN PATENT DOCUMENTS

| | | |
|---|---|---|
| 55-84896 | 6/1980 | Japan . |
| 57-26299 | 2/1982 | Japan . |
| 62-3198 | 1/1987 | Japan . |
| 2259299 | 10/1990 | Japan . |

*Primary Examiner*—Louis J. Casaregola
*Attorney, Agent, or Firm*—Antonelli, Terry, Stout & Kraus, LLP

[57] ABSTRACT

In a gas turbine apparatus including a turbine stage and a compressor stage, when an abrupt load variation occurs in a centrifugal compressor which increases pressures of a fuel such as city gas or liquefied natural gas to feed the fuel, a gas turbine control device effects a control so that a discharge pressure of the centrifugal compressor can be kept to within a predetermined pressure range. When a fuel flow demand for the centrifugal compressor is inputted to the gas turbine control device, a signal corresponding to this fuel control signal is inputted to a bypass valve of the centrifugal compressor simultaneously when it is inputted to gas turbine fuel control valves provided in the gas turbine apparatus. When the load is abruptly varied, the degree of opening of the bypass valve of the centrifugal compressor is changed to a value determined by a prestored relation between the fuel control signal and the degree of opening of the bypass valve.

14 Claims, 5 Drawing Sheets

GAS TURBINE APPARATUS AND METHOD OF OPERATING SAME ON GASEOUS FUEL

BACKGROUND OF THE INVENTION

This invention relates generally to a gas turbine apparatus, and more particularly to a gas turbine apparatus of the type which is installed in power generating facilities, and uses city gas or liquefied natural gas as a fuel. The present invention also relates to a method for operating such a gas turbine apparatus.

A gas turbine apparatus has an operational mode called "load shutdown" in which, in the event of abnormality in a generator serving as a load, the load is disconnected to thereby protect the gas turbine. In this mode, the load of the gas turbine is abruptly changed from 100% to 0%, and this has heretofore been achieved by abruptly closing a fuel flow control valve. At this time, a rotational speed of the gas turbine is controlled by a gas turbine control device to be within a certain range.

In the type of gas turbine apparatus using city gas or liquefied natural gas as a fuel, a centrifugal compressor is used to supply the fuel to a combustor of the gas turbine apparatus. In the event of the above-described load shutdown, the rotational speed of this centrifugal compressor transiently increases, or a discharge pressure thereof increases. When this discharge pressure exceeds an allowable upper limit value, the fuel, such as city gas or liquefied natural gas excessively flows into the combustor, thereby causing the gas turbine to rotate at an unduly high speed. In order to prevent such a situation, there has heretofore been used a method in which the flow rate of the gas, handled by the centrifugal compressor for feeding the fuel under pressure, is measured, and when the flow rate decreases, a valve (hereinafter often referred to as "bypass valve") provided in a flow passage is opened.

By the way, when the flow rate of the handled gas is reduced, the pressure and the flow rate suddenly fluctuate in the centrifugal compressor to cause a surging phenomenon in which vibrations increase. In order to prevent this phenomenon, there is widely known a method, as described above, in which the flow rate of the gas is measured, and if the flow rate is lower than the predetermined value, the rate of flow through the centrifugal compressor is increased to prevent the surging of the centrifugal compressor, and also the bypass valve or a discharge valve is opened, thereby controlling the rate of flow to be fed to the gas turbine to a predetermined level. Such surging prevention method is disclosed, for example, in "JSME Mechanical Engineering Handbook, Revised 6th Edition" compiled by the Japan Society of Mechanical Engineers (1985; Vol. 10, pages 10–33).

The above conventional control method, in which the rate of flow of the handled gas is measured, and when this flow rate decreases, the bypass valve is opened, suffers from a drawback that since the bypass valve used for controlling the flow rate of the fuel of the gas turbine is closed instantaneously (about 0.1 second), the discharge pressure of the centrifugal compressor exceeds the above upper limit value.

SUMMARY OF THE INVENTION

It is an object of this invention to provide a gas turbine apparatus which, even when a load shutdown occurs (load is abruptly varied), a discharge pressure of a centrifugal compressor for feeding a fuel under pressure to a combustor is prevented from increasing unduly, and also a rotational speed of a gas turbine is prevented from increasing unduly, thereby protecting the gas turbine apparatus, and thus enhancing its reliability.

According to a first aspect of the present invention, there is provided a gas turbine apparatus comprising a gas turbine which includes a compressor stage, a turbine stage, and a combustor. The turbine serves to feed combustible gas, such as city gas, or liquefied natural gas under pressure to the combustor, by means of a centrifugal compressor, where it is burned to produce power. Also, provided is a gas turbine control device for controlling the gas turbine. The centrifugal compressor includes a flow pipe through which the combustible gas flows from an outlet of the centrifugal compressor to an inlet thereof, and opening/closing means for opening and closing the flow pipe. The gas turbine control device includes flow rate control means for controlling the rate of flow of the combustible gas, and signal producing means for producing an opening/closing signal for the opening/closing means in synchronism with a signal from the flow rate control means.

According to a second aspect of the invention, there is provided a gas turbine apparatus comprising a gas turbine which includes a compressor stage, a turbine stage, and a combustor. The turbine serves to feed a combustible gas, such as city gas or liquefied natural gas, under pressure to the combustor by means of a centrifugal compressor where it is burned to produce power. A gas turbine control device for controlling the gas turbine is also provided. The gas turbine apparatus includes fuel flow rate control means for controlling the rate of flow of the combustible gas. The centrifugal compressor includes a flow pipe, through which the combustible gas flows from an outlet of the centrifugal compressor to an inlet thereof, and opening/closing means for opening and closing the flow pipe. The gas turbine control device includes command means for feeding a command value, which is produced by the gas turbine control device to be fed to the fuel flow rate control means, to the opening/closing means simultaneously when the command value is fed to the fuel flow rate control means.

According to a third aspect of the invention, there is provided a gas turbine apparatus comprising a gas turbine which includes a compressor stage, a turbine stage, and a combustor. The gas turbine serves to feed a combustible gas, such as city gas or liquefied natural gas, under pressure to the combustor by means of a centrifugal compressor where it is burned to produce power. A gas turbine control device for controlling the gas turbine is also provided. The gas turbine control device comprises: start-up control means; acceleration control means; speed/load control means; load limitation means; exhaust gas temperature control means; selection means for selecting the least one among control signals outputted respectively from the above five control means and for outputting the least signal; and flow rate control means responsive to the output of the selection means for controlling the rate of flow of the fuel through flow means through which the combustible gas flows from an outlet of the centrifugal compressor to an inlet thereof and for controlling the rate of flow of the fuel flowing into the gas turbine.

According to a fourth aspect of the invention, there is provided a method of operating a gas turbine apparatus, which uses as a fuel liquefied natural gas or city gas fed under pressure by a centrifugal compressor, comprising the steps of:

producing a fuel control signal in accordance with at least one of signals outputted respectively from start-up control means, acceleration control means, speed/load control means, load limitation means and exhaust gas temperature control means provided in gas turbine control means provided in the gas turbine apparatus; and controlling the rate of flow of the fuel into the gas turbine apparatus, as well as the rate of flow of the fuel around the centrifugal compressor, by the gas turbine control means in accordance with the fuel control signal.

A 100% load shutdown mode among operation modes of a gas turbine is one in which a load variation is the largest. In this operation mode, a signal (FFD: Fuel Flow Demand) for controlling the flow rate of the fuel of the gas turbine is instantaneously changed from 100% to 0%, so that a flow rate control valve is switched from an open condition to a closed condition, thus switching the gas turbine from a 100% load condition to a zero load condition.

At the time of this load shutdown, the fuel flow rate control valve is switched from the open condition to the closed condition in about 0.1~0.2 seconds. Therefore, the response is too late with a conventional method of controlling a centrifugal compressor, which feeds the fuel gas, by a bypass valve, in which method the flow rate handled by the centrifugal compressor is monitored, and when the flow rate becomes less than a lower limit value, the bypass valve is opened. As a result, a discharge pressure of the centrifugal compressor increases instantaneously, so that the number of revolutions of the gas turbine exceeds an upper limit value.

In the gas turbine apparatus, even at the time of the load shutdown, the discharge pressure of the centrifugal compressor is required to be within a predetermined range. To meet this requirement, there are proposed two methods, and one is to provide a tank having a large volume between the centrifugal compressor and the gas turbine so as to reduce a pressure fluctuation, and the other is to quicken the response to the control command of the centrifugal compressor.

The present invention is directed to the latter method, and the fuel flow demand (FFD) of the gas turbine is inputted early to the bypass valve control device of the fuel gas compressor in preparation for the control of the bypass valve, thereby quickening the response, so that even in the event of load shutdown, the discharge pressure of the centrifugal compressor is kept to within a predetermined range.

DESCRIPTION OF THE PREFERRED EMBODIMENTS

Figure 1:
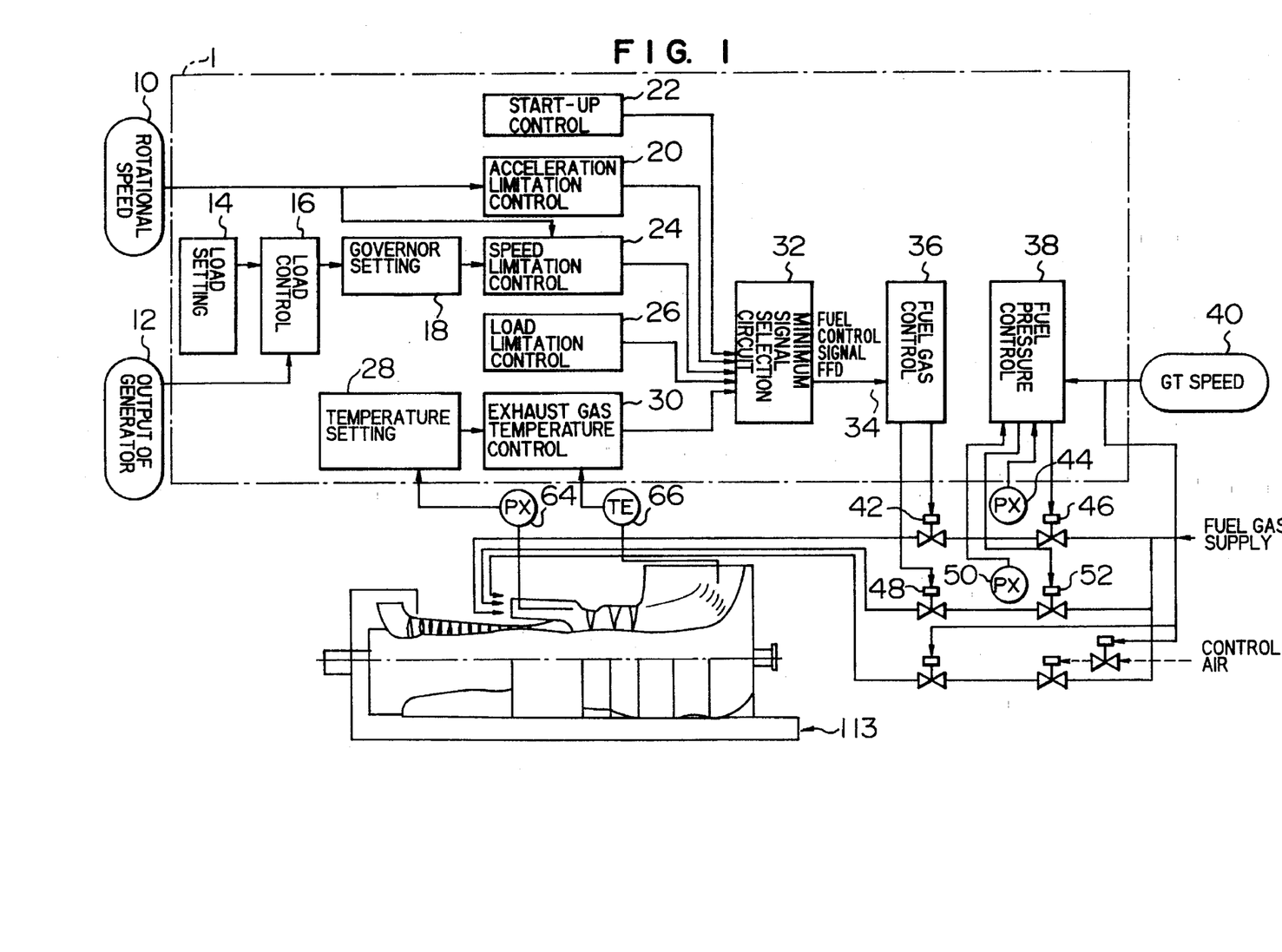
FIG. 1 is a schematic control flow diagram of one preferred embodiment of a gas turbine apparatus of the present invention.
Figure 2:
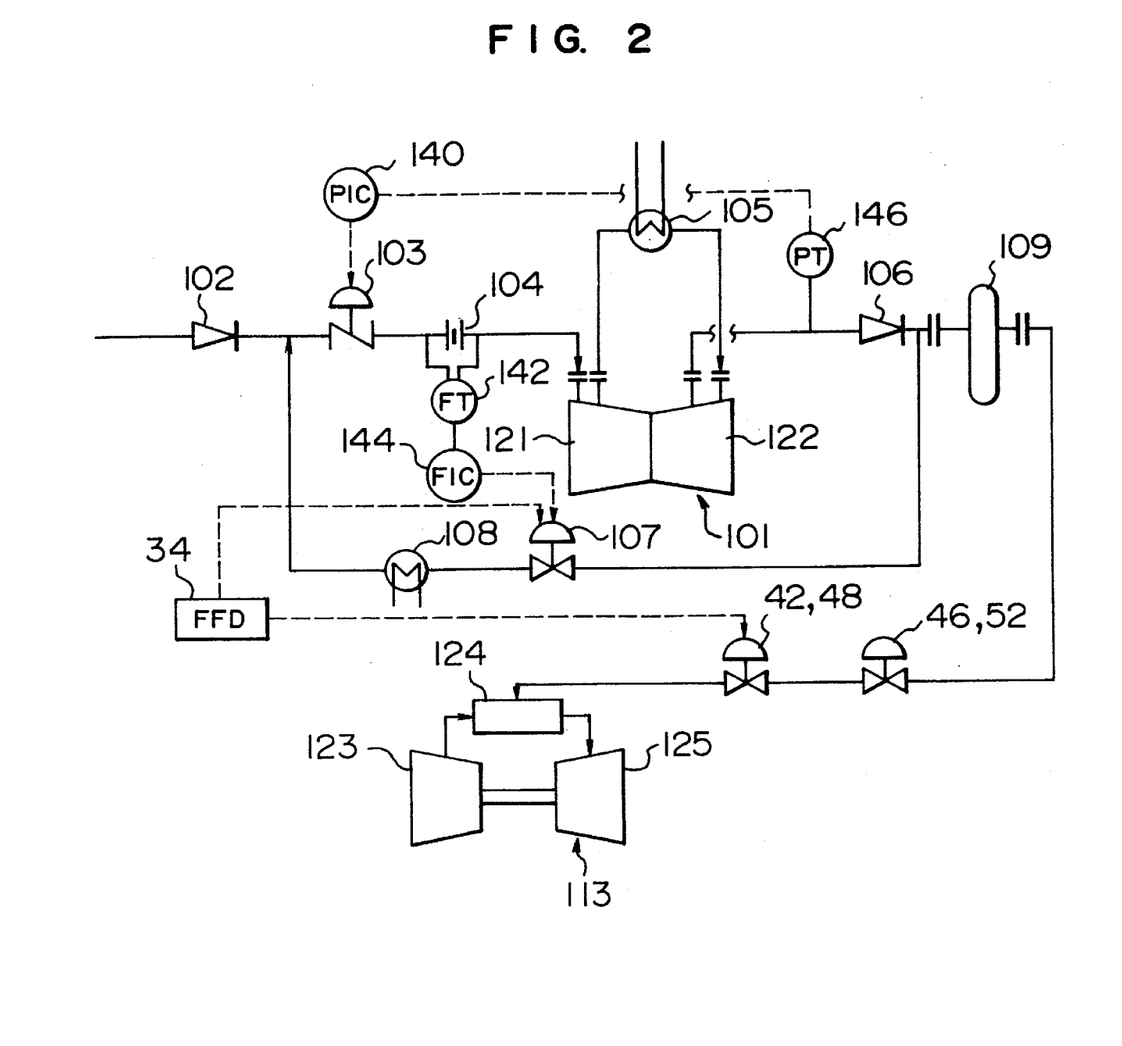
FIG. 2 is a control flow diagram of a main portion of the gas turbine apparatus of FIG. 1.
Figure 3:
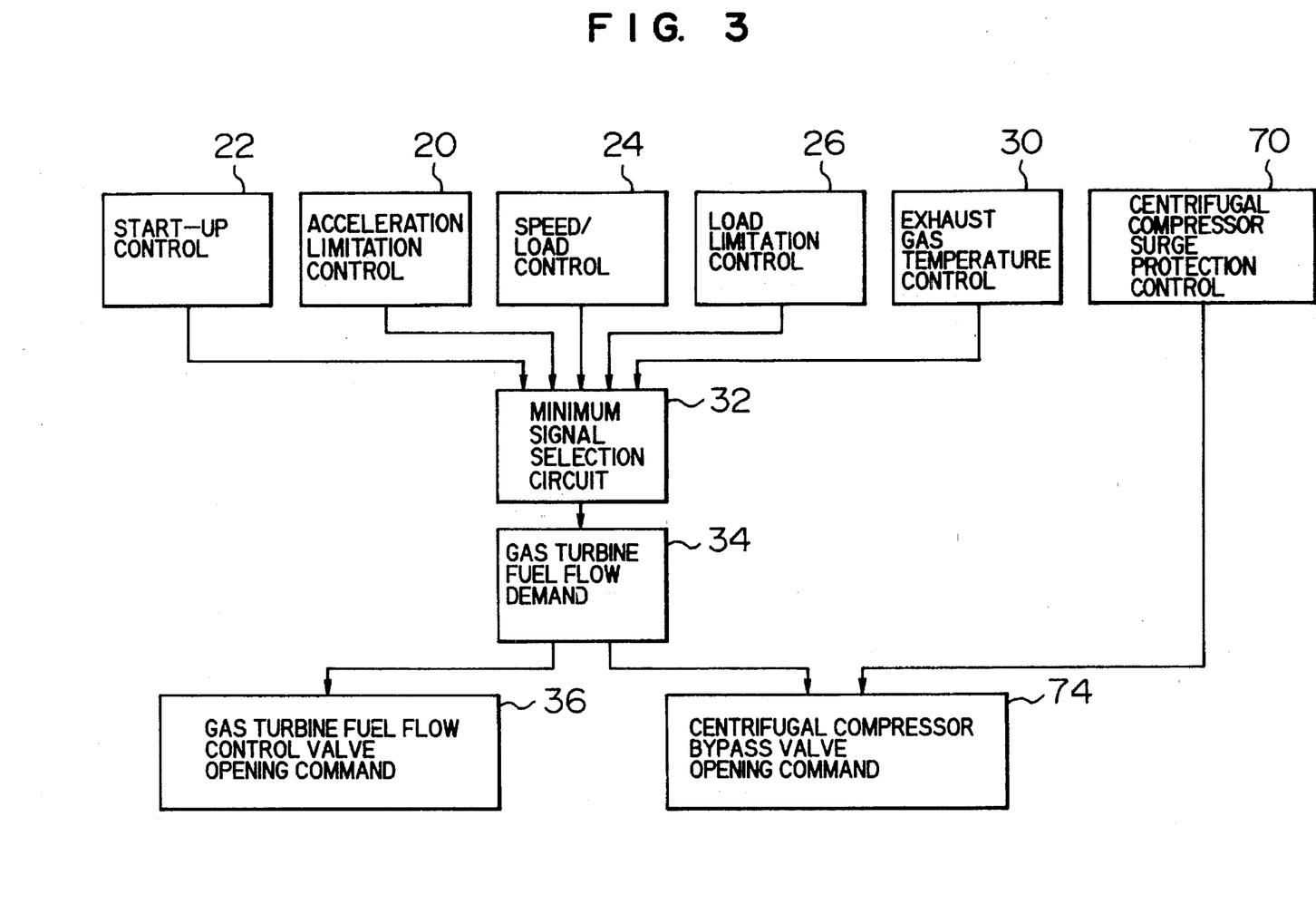
FIG. 3 is a control block diagram of one example of a centrifugal compressor of the present invention.

One preferred embodiment of a gas turbine apparatus of the present invention will now be described with reference to the drawings. FIG. 1 is a schematic control flow diagram of a gas turbine, and FIG. 2 shows an essential portion of the flow diagram shown in FIG. 1. FIG. 3 is a control diagram for a centrifugal compressor for feeding fuel under pressure.

The gas turbine 113 is provided with a gas turbine control system 1. The gas turbine control system 1 is a digital control system, and effects the optimum control at the time of start-up and stop of the gas turbine and during the operation of a load so as to enable an automatic operation of a gas turbine power generating unit. Control functions for this purpose include an adjustment control function and a sequence control function. This gas turbine control system 1 further includes a protective device which gives an alarm when conditions undesirable for the operation of the gas turbine arise, and automatically stops the gas turbine apparatus.

The adjustment control function cooperates with the sequence control function to adjust an amount of supply of fuel and so on in accordance with the operating condition of the gas turbine. In order to achieve this function, the gas turbine control system 1 includes a start-up control circuit 22, an acceleration limitation control circuit 20, a speed/load control circuit 24, a load limitation control circuit 26, an exhaust gas temperature control circuit 30, a fuel gas control circuit 36, a fuel pressure control circuit 38 and a compressor inlet guide vane control circuit.

The start-up control circuit 22 serves to set values of fuel flow rate instructions for ignition, warming-up and acceleration at the start-up of the gas turbine. The acceleration limitation control circuit 20 serves to monitor the rotational speed 10 of the gas turbine at the start-up of the gas turbine, and effects a control so that the rate of acceleration of the turbine will not exceed a limit value. The speed/load control circuit 24 serves to control the operation of a governor in accordance with a speed in synchronism with the gas turbine system after the achievement of a rated speed and also in accordance with a permanent speed variation during the operation of a load. The adjustment of a governor setting circuit 18 at the synchronous speed operation is effected by the gas turbine control system. On the other hand, the output of the governor setting circuit 18 at the time of the operation of a load is either so adjusted that it is maximized within the limit of an output of the exhaust gas temperature control circuit 30, or is automatically adjusted in a load control means 16 so that an output value of a load setting circuit 14 manually set by the operator can be an output 12 of a generator.

The load limitation control circuit 26 serves to effect a constant-output operation by load limitation setting during the operation of the load. The exhaust gas temperature control circuit 30 serves to effect a limit control of the temperature of the exhaust gas of the gas turbine at the start-up and during the operation of the load. At the start-up, this circuit 30 controls the fuel so that the temperature of the exhaust gas of the gas turbine detected by a thermocouple 66 will not exceed an allowable value, and also during the operation of the load, this circuit 30 limits the maximum output in accordance with the temperature of the exhaust gas of the gas turbine set by a temperature setting means 28 in accordance with an output of a pressure transducer 64 representing a pressure at an outlet of a combustor. In the temperature limit control, instead of the temperature of the inlet of the gas turbine, the temperature of the outlet of the gas turbine is measured, and a value, corrected by a discharge pressure of the compressor of the gas turbine, is used for this control.

A minimum signal selection circuit 32 selects the least signal as a fuel control signal among the signals outputted respectively from the above five control circuits. The fuel gas control circuit 36 determines the degree of opening of fuel flow rate control valves in accordance with the fuel flow demand signal (FFD) 34, outputted from the minimum signal selection circuit 32, to control an amount of the fuel to be injected to the combustor 124. On the other hand, the fuel pressure control circuit 38 controls pressure control valves 46 and 52 so that outputs of pressure transducers 44 and 50, provided respectively before the fuel flow rate control valves 42 and 48, can be their respective predetermined values corresponding to the rotational speed the gas turbine. The compressor inlet guide vane control circuit serves to adjust an amount of the suction (intake) air so that the temperature of the exhaust gas of the gas turbine is made maximum within an allowable limit. At the start-up, in order to prevent pulsation of the air generating in the compressor of the gas turbine, the minimum opening degree is maintained by this circuit.

The gas turbine apparatus is operated while effecting such various controls. At the time of a load shutdown, the fuel flow rate control valves 42 and 48 are abruptly closed in accordance with the output of the fuel control circuit 36.

This will now be described with reference to FIGS. 2 and 3. The compressor 101 feeds city gas or liquefied natural gas under pressure to the combustor 124 of the gas turbine. The compressor 101 comprises a low-pressure stage 121 and a high-pressure stage 122, and an intermediate cooler 105 is provided between the two stages, and the fuel, raised in temperature at the low-pressure stage, is cooled by this cooler, and then is fed to the high-pressure stage. An orifice 104, a suction valve 103 and a suction check valve 102, arranged in this order from the low-pressure stage 121, are connected at an upstream side of the low-pressure stage 121 through piping. On the other side, a discharge check valve 106 and a discharge tank 109, arranged in this order from the high-pressure stage 122, are connected to a downstream side of the high-pressure stage 122 through piping. At a downstream side of the discharge tank 109, fuel pressure control valves 46 and 52 and the fuel flow rate control valves 42 and 48, of the gas turbine 113 are connected in series respectively, through respective fuel pipe lines. The fuel pipes are, for example, a pipe having a diameter of 4 inches (4B). Although it is preferred to use a centrifugal compressor as the compressor, other turbo compressor may be used in the present invention. In the description given below, a centrifugal compressor is used as the compressor.

A pipe (bypass pipe) which goes around the centrifugal compressor 101 (This flow will be hereinafter referred to as "bypass" for convenience) is connected between a point near to the outlet of the high-pressure stage 122 of the centrifugal compressor 101 and a point intermediate the suction check valve 102 and the orifice 104 connected to the low-pressure stage 121. A bypass valve 107 and a bypass cooler 108 are provided midway this bypass pipe. As the flow rate of the centrifugal compressor 101 is decreasing, the centrifugal compressor 101 is brought into a surging region, and finally causes a vibration phenomenon. Therefore, in order to prevent the surging of the centrifugal compressor 101, the rate of flow of the gas through the centrifugal compressor is increased, and part of the gas discharged from the centrifugal compressor is returned to the suction side by the provision of the bypass passage. Further, a sensor for detecting a pressure purposes is provided in the vicinity of the outlet of the high-pressure stage 122, and an output of this sensor is fed to a pressure indication regulator 140 by a transmitter 146. On the other hand, the flow rate of the fuel, measured by the orifice 104 provided upstream of the low-pressure stage 121, is fed to a fuel flow rate indication regulator 144 by a flow rate transmitter 142.

In this embodiment, the relation between the flow demand (FFD) of the gas turbine and the degree of opening of the bypass valve 107 is so determined that when the fuel flow demand (FFD) becomes small, the bypass valve 107 is automatically opened. A control system can be used in combination, in which a flow rate sucked by of the compressor is monitored by an orifice as in the conventional system, and when the flow rate reaches its lower limit value, the bypass valve 107 is opened. In this case, when either of the fuel flow demand (FFD) and the suction flow rate control command is inputted, the bypass valve 107 is opened. In either of these methods, a centrifugal compressor surge protection control system 70, including the pressure transmitter 146, the pressure indication regulator 140, the flow rate transmitter 142 and the flow rate indication regulator 144, operates, and as a result a centrifugal compressor bypass valve opening degree command 74 is given.

Figure 4:
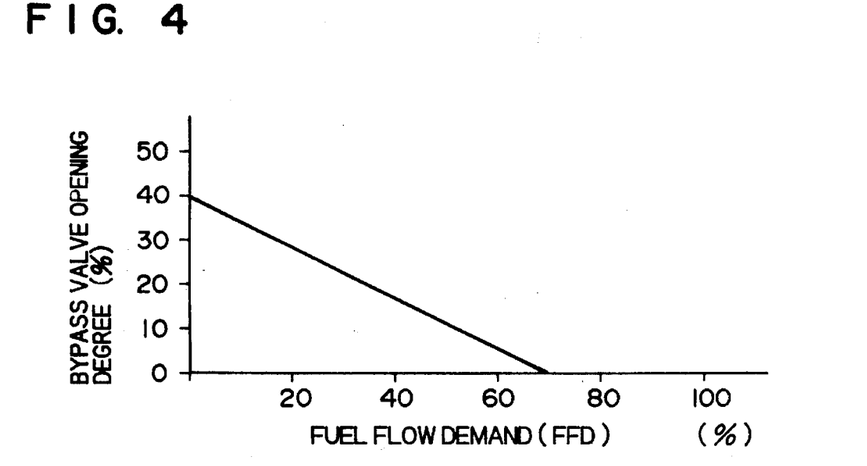
FIG. 4 is a diagram showing the relation between a valve opening degree and a fuel flow.

Incidentally, in the event of an abrupt change of the load, the response to valve opening is too late with the conventional method of opening the bypass valve, and therefore the discharge pressure of the centrifugal compressor instantaneously increases, so that the rotational speed of the gas turbine exceeds the upper limit value. To prevent this, the use of the valve capable of achieving the shut-off instantaneously (about 0.1 second) involves a high cost when the fuel pipes with as large a diameter as 4 inches are used, and besides the apparatus is much increased in size. Therefore, the gas turbine fuel flow demand (FFD) 34 is inputted to the bypass valve of the centrifugal compressor, which feeds the fuel under pressure simultaneously when this fuel flow demand (FFD) is inputted to the fuel gas control circuit 36. Here, in each individual gas turbine apparatus, a predetermined relation is established between the fuel flow demand 34 and the degree of opening of the fuel gas bypass valve 107. More specifically, for example, as shown in FIG. 4, the bypass valve 107 is fully opened when the fuel flow demand is not less than 70%, and as the fuel flow demand is decreasing, the bypass valve 107 is gradually closed, and the degree of opening of the bypass valve is reduced to 40% when the fuel flow demand is 0%. This relation is stored in an associated memory of the gas turbine control system 1, and each time the fuel control signal is renewed, the stored value is read from the memory, so that a change in the load can be rapidly dealt with.

Figure 5:
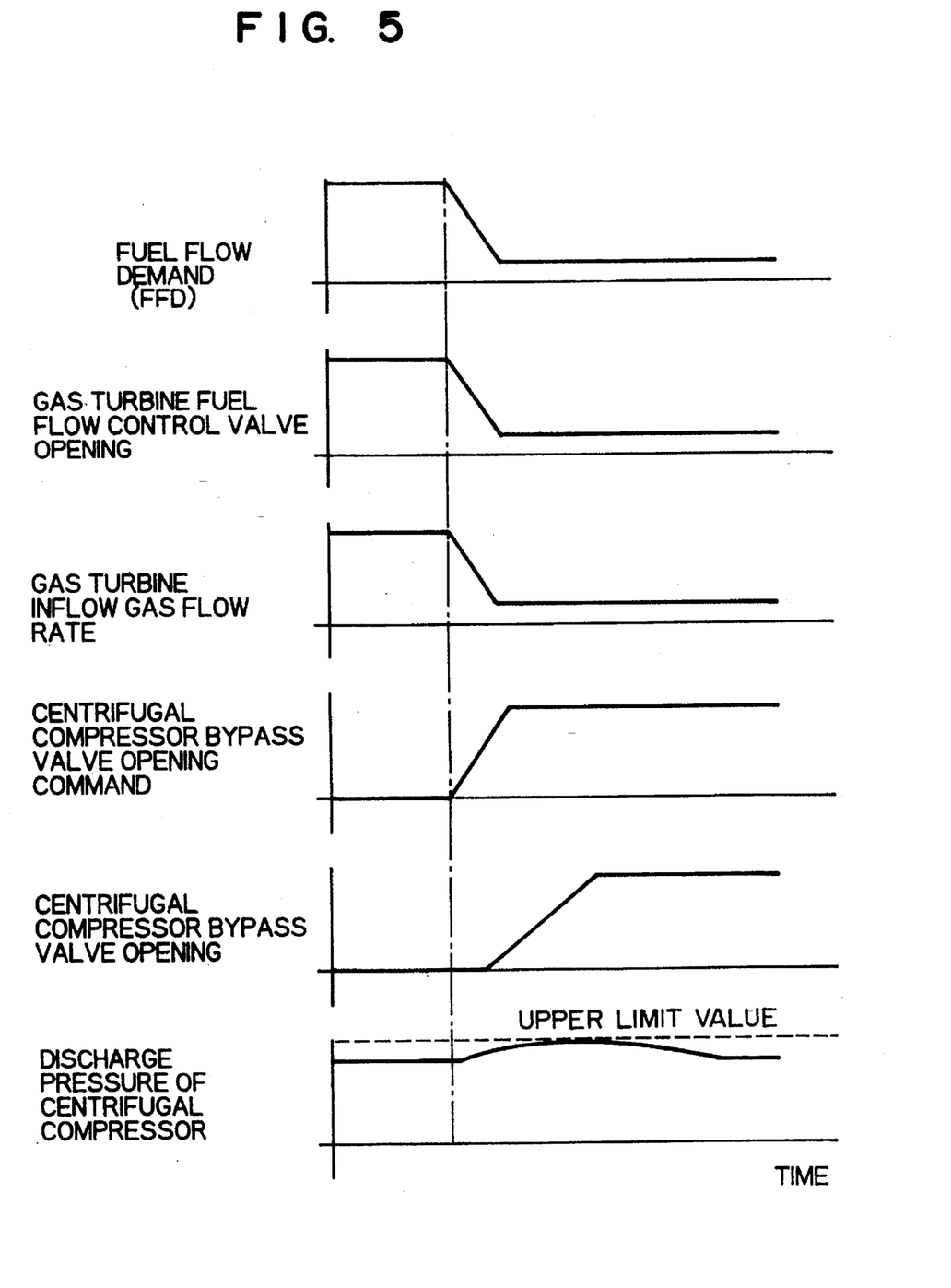
FIG. 5 is a time chart at the time of a load shutdown in the gas turbine apparatus.
Figure 6:
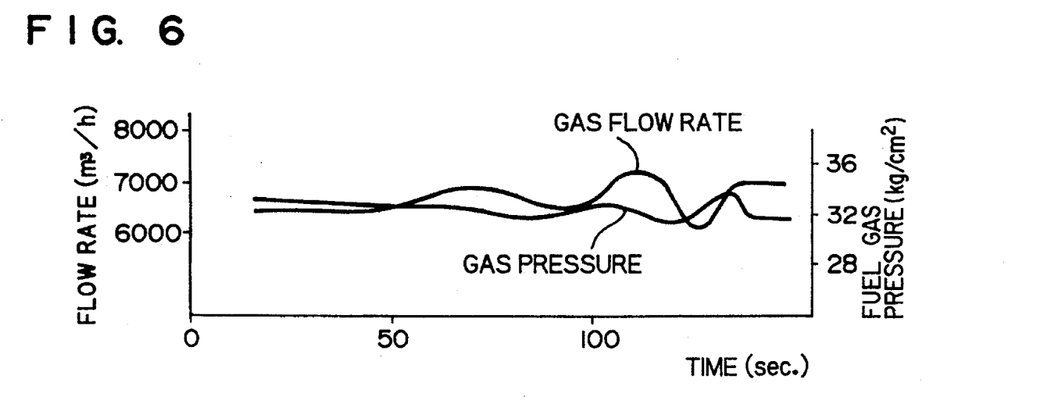
FIG. 6 is a diagram showing results of the operation of one example of a gas turbine apparatus.
Figure 7:
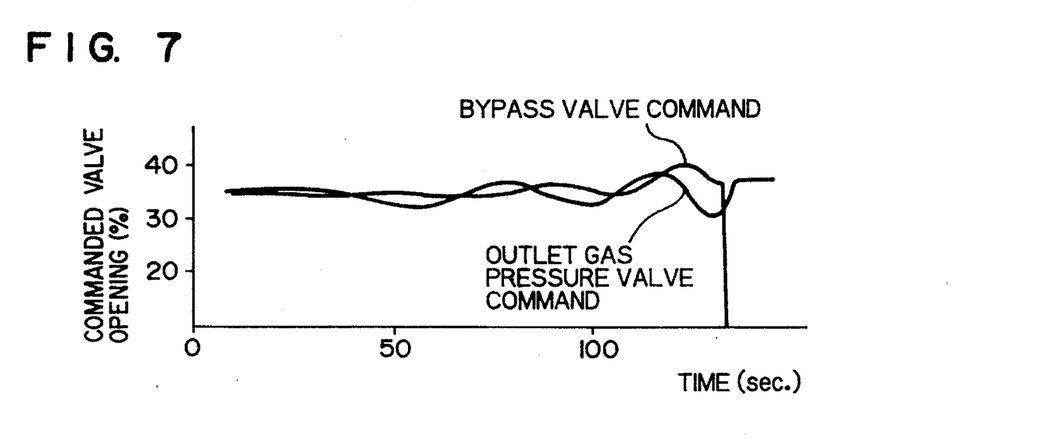
FIG. 7 is a diagram showing other results of the operation of the gas turbine apparatus of FIG. 6.

FIGS. 5, 6 and 7 show changes of the various values with time at the time of the load shutdown. FIG. 5 is a diagrammatical illustration thereof, and FIGS. 6 and 7 show one example of measurement results.

In FIG. 5, when the fuel flow demand (FFD) 34 produces a fuel decrease demand, the degree of opening of the gas turbine fuel flow rate control valves 42, 48 decreases in accordance with the demand amount of FFD. Since the fuel decrease demand is fed, the gas turbine control system 1 commands the control device of the centrifugal compressor to reduce the amount of feed of the fuel under pressure. At this time, if the flow rate of the centrifugal compressor is merely reduced, the centrifugal compressor causes surging, and therefore the rate of flow of the gas through the centrifugal compressor needs to be above a predetermined level which will not cause surging. Therefore, the control device of the centrifugal compressor produces the valve opening command for the bypass valve of the centrifugal compressor. This command is produced generally simultaneously with the production of the fuel flow demand (FFD), and therefore the opening degree of the bypass valve of the centrifugal compressor produces less time lag relative to the demand as compared with the conventional system. The opening and closing operation of the bypass valve is a mechanical operation, and therefore it takes a longer time for the demand to be achieved as compared with other operations. When the suction flow rate valve 103, the bypass control valve 107 and the flow control valves 42, 48 are controlled as described above, the discharge pressure of the centrifugal compressor will not exceeds its upper limit value as shown at the bottom of FIG. 5, so that the surging can be prevented. Next, one example of the result of operating the gas turbine in accordance with this principle will now be described with reference to FIGS. 6 and 7.

As shown in FIG. 7, when the fuel flow rate control valves are fully closed from 37% to 0% in 2 seconds, the fuel gas flow rate increases from about 6,100 m$^3$/hr to about 7,100 m$^3$/hr. On the other hand, the pressure of the fuel gas at the outlet of the centrifugal compressor merely increases from about 25 kg/cm$^2$ to about 27.7 kg/cm$^2$, so that the surging, which is an adverse effect for the centrifugal compressor, can be prevented from developing. The fact that the surging is not produced can be confirmed from the diagram indicating the discharge gas pressure. Therefore, there can be obtained the gas turbine apparatus of a high reliability. Moreover, by effecting the above control, a pressure fluctuation at the outlet of the centrifugal compressor can be reduced, and the volume of the discharge tank 109 provided for the purpose of absorbing the pressure fluctuation can be reduced.

In the present invention, even when an abrupt load variation due to load shutdown is encountered in the gas turbine apparatus, the fuel control signal, which is the output signal of the minimum signal selection circuit, is outputted also to the bypass valve of the centrifugal compressor, and therefore the bypass valve can be opened at an early timing, and the discharge pressure of the centrifugal compressor can be limited to a level below the upper limit value. As a result, the gas turbine can be operated within the range of the required rotational speed, so that the reliability of the gas turbine apparatus is enhanced. Furthermore, by reducing the degree of fluctuation of the discharge pressure of the centrifugal compressor, the volume of the discharge tank provided between the centrifugal compressor and the gas turbine can be reduced.

What is claimed is:

1. In a gas turbine apparatus, comprising a gas turbine which includes a compressor stage, a turbine stage and a combustor, and serves to feed a combustible gas under pressure to said combustor by means of a centrifugal compressor and burn the same to produce power, and a gas turbine control device for controlling said gas turbines, the improvement wherein said centrifugal compressor comprises:

bypass means for separating a portion of fuel, which has passed through said centrifugal compressor, and for returning said portion to a suction side of said centrifugal compressor, and control means for controlling a flow rate of fuel passing through said bypass means; and said gas turbine control device comprises start-up control means, acceleration control means, speed/load control means, load limitation means, exhaust gas temperature control means, and selection means for selecting the least one among control signals outputted from said five control means and outputting the selected signal; and wherein said gas turbine control device acts to control a flow rate of fuel, which passes through said bypass means, by making use of said bypass rate control means on the basis of outputs from said selection means.

2. A gas turbine apparatus according to claim 1, wherein said gas turbine control device comprises storage means for storing beforehand a relationship between outputs of said selection means and a flow rate of fuel which passes through said bypass means.

3. A method of operating a gas turbine apparatus using a combustible gas as a fuel fed under pressure by a centrifugal compressor, comprising the steps of:

generating a fuel control signal from a gas turbine control means, provided on said gas turbine apparatus, on the basis of at least one of signals outputted from five control means comprising start-up control means, provided on said gas turbine control means, acceleration control means, speed/load control means, load limitation means, and exhaust gas temperature control means; and controlling, using a fuel flow rate control means provided on said gas turbine apparatus, a flow rate of fuel flowing into said gas turbine apparatus on the basis of said fuel control signal; and controlling, using flow rate control means provided in a bypass means for returning a portion of fuel, which has passed through said centrifugal compressor, to a suction side of said centrifugal compressor, a flow rate of fuel passing through said bypass means on the basis of said fuel control signal.

4. A method according to claim 3, further comprising the steps of:

outputting, from said gas turbine control means, said fuel control signal to both of said fuel flow rate control means provided on said gas turbine apparatus and said flow rate control means provided in said bypass means on said centrifugal compressor in a synchronous manner.

5. A gas turbine apparatus using combustible gas as a fuel fed under pressure by a centrifugal compressor, comprising:

at least five control means comprising:
  start-up control means,
  acceleration control means,
  speed/load control means,
  load limitation means, and
  exhaust gas temperature control means;

gas turbine control means for generating a fuel control signal based on at least one of signals outputted from said at least five control means, said start-up control means provided on said gas turbine control means;

a fuel flow rate control means, provided on said gas turbine apparatus, for controlling a flow rate of fuel flowing into said gas turbine apparatus based on said fuel control signal;

bypass means for returning a portion of fuel, which has passed through said centrifugal compressor, to a suction side of said centrifugal compressor;

bypass rate control means, provided on said centrifugal compressor; and flow rate control means, provided in said bypass means, for controlling a flow rate of fuel passing through said bypass means based on said fuel control signal;

wherein said gas turbine control means outputs said fuel control signal to said fuel flow rate control means and said bypass rate control means in a synchronous manner.

6. The gas turbine apparatus of claim 1, wherein said combustible gas is one of city gas or liquefied natural gas.

7. The method of claim 3, wherein said combustible gas is one of city gas or liquefied natural gas.

8. The gas turbine apparatus of claim 5, wherein said combustible gas is one of city gas or liquefied natural gas.

9. The gas turbine apparatus of claim 1, wherein said bypass means separates said fuel, in conjunction with said bypass rate control means, in such a manner that the flow rate of fuel at the suction side of the centrifugal compressor is maintained at a predetermined magnitude, in spite of surging effects produced by a low-load condition on the gas turbine.

10. The method of claim 3, further comprising the step of:

controlling said bypass means and said flow rate control means so that said bypass means separates said fuel in such a manner that the flow rate of fuel at the suction side of the centrifugal compressor is maintained at a predetermined magnitude, in spite of surging effects produced by a low-load condition on a gas turbine.

11. The gas turbine apparatus of claim 5, wherein said bypass means returns fuel, in conjunction with said flow rate control means, in such a manner that the flow rate of fuel at the suction side of the centrifugal compressor is maintained at a predetermined magnitude, in spite of surging effects produced by a low-load condition on a gas turbine.

12. The gas turbine apparatus of claim 1, further comprising:

a valve control means for controlling a degree of closing of a valve that controls flow rate of fuel into the gas turbine, said valve being controlled in such a manner that the closing of said valve is coordinated with control of the flow rate of fuel passing into the suction side of the centrifugal compressor by said bypass rate control means.

13. The method of claim 3, further comprising the step of:

controlling a degree of closing of a valve that controls flow rate of fuel into a gas turbine in such a manner that the closing of said valve is coordinated with control of the flow rate of fuel at the suction side of the centrifugal compressor by said flow rate control means.

14. The gas turbine apparatus of claim 5, further comprising:

a valve control means for controlling a degree of closing of a valve that controls flow rate of fuel into a gas turbine, said valve being controlled in such a manner that the closing of said valve is coordinated with control of the flow rate of fuel at the suction side of the centrifugal compressor by said flow rate control means.

* * * * *